US007355941B2

United States Patent
Yasukawa et al.

(10) Patent No.: US 7,355,941 B2
(45) Date of Patent: Apr. 8, 2008

(54) INFORMATION RECORDING METHOD AND OPTICAL DISK APPARATUS FOR RECORDING INFORMATION ON A RECORDING-TYPE OPTICAL DISK

(75) Inventors: Takakiyo Yasukawa, Fujisawa (JP); Atsushi Saito, Hino (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 525 days.

(21) Appl. No.: 10/808,920

(22) Filed: Mar. 24, 2004

(65) Prior Publication Data

US 2005/0141366 A1  Jun. 30, 2005

(30) Foreign Application Priority Data

Dec. 25, 2003  (JP) .............................. 2003-428623

(51) Int. Cl.
  *G11B 7/0045*  (2006.01)
(52) U.S. Cl. .................................. 369/47.5
(58) Field of Classification Search ...................... None
See application file for complete search history.

(56) References Cited

U.S. PATENT DOCUMENTS 6,639,890 B1 * 10/2003 Miura et al. ............... 369/47.5

| | | | |
|---|---|---|---|
| 2002/0003760 A1* | 1/2002 | Honda | 369/47.52 |
| 2002/0110065 A1* | 8/2002 | Wang et al. | 369/47.53 |
| 2002/0122359 A1* | 9/2002 | Yoshida | 369/44.11 |
| 2002/0176338 A1* | 11/2002 | Ushiyama et al. | 369/47.53 |
| 2003/0185120 A1 | 10/2003 | Morozumi et al. | |
| 2005/0078578 A1 | 4/2005 | Sasaki | |

FOREIGN PATENT DOCUMENTS

| JP | 07-287847 A | 10/1995 |
|---|---|---|
| JP | 11-025575 A | 1/1999 |
| JP | 2000-195054 | 7/2000 |
| JP | 2002-175624 | 6/2002 |
| JP | 2002-298356 | 10/2002 |
| JP | 2003-162816 | 6/2003 |
| JP | 2003-257032 A | 9/2003 |
| JP | 2004-86999 | 3/2004 |

* cited by examiner

*Primary Examiner*—William Korzuch
*Assistant Examiner*—Nathan Danielsen
(74) *Attorney, Agent, or Firm*—Townsend and Townsend and Crew LLP (57) ABSTRACT

An information recording method includes the steps of carrying out an experimental write on both inner-peripheral and outer-peripheral experimental writing areas, in the case of the outer-peripheral experimental writing, a constant recording power computed on the basis of the optimum recording power is used, which is estimated by the inner-peripheral experimental writing, in addition, an optical disk apparatus operates according to this information recording method, thereby removing the fluctuation factors of the disk.

16 Claims, 6 Drawing Sheets

INFORMATION RECORDING METHOD AND OPTICAL DISK APPARATUS FOR RECORDING INFORMATION ON A RECORDING-TYPE OPTICAL DISK

CROSS-REFERENCE TO RELATED APPLICATION

This application relates to Japanese Patent Application No. 2003-428623 filed on Dec. 25, 2003, the entire disclosure of which is incorporated herein by reference.

BACKGROUND OF THE INVENTION

1. Field of the Invention

The present invention relates to an optical disk apparatus for recording information on an information recording medium by using semiconductor laser.

2. Description of the Related Art

Optical disks of recording data include a write once type optical disk capable of recording data only once (CD-R, DVD-R, DVD+R and the like) and a rewritable type optical disk capable of rewriting data (CD-RW, DVD-RAM, DVD-RW, DVD+RW and the like).

In the case of the write once type optical disk, a recording layer made up of an organic dye is irradiated by a laser beam to change its property, thus forming pits thereon to record data. On the other hand, in the case of the rewritable type optical disk, data is rewritten by the reversible change of the recording layer called the phase change. More specifically, the irradiation of high-power laser beam on the recording medium and quenching effect cause it to be transformed into the amorphous state, while the irradiation of medium-power laser beam on the recording medium and slow cooling effect cause it to be transformed into the crystalline state. Thus, this phase change makes data to be recorded or erased.

When recording an optical disk, the recording conditions are scattered depending on combination of the optical disk and optical disk apparatus used for the recording. For example, they depend on the external environments such as temperature and humidity, the characteristics of the recording films of optical disks, and the mechanical characteristics such as groove shape and warpage of disk. Some optical disk apparatuses incorporate an adjustment method for reducing these scattering effects.

For example, there is an optical disk apparatus that has a function to adjust the recording laser power called OPC (Optimum Power Control). This method is to write as a test on a laser power adjusting region or a PCA (Power Calibration Area) provided on each optical disk and to determine the optimum laser power in each recording condition from the vertical asymmetry of the reproduction result from this area (for example, referring to JP-A-2002-175624 and JP-A-2002-298356).

SUMMARY OF THE INVENTION

In recent years, fast recording on the optical disk has been demanded in order to reduce the time taken for data to be completely recorded. As a method for the fast recording, the inner peripheral side regions of the optical disk are recorded at a low linear velocity, and the outer-peripheral regions are recorded at a high linear velocity, thereby achieving the reduction of the time taken for the recording. In this case, the linear velocity capable of being achieved for the inner-peripheral side is limited because the revolution speed of the optical disk has an upper limit due to the characteristics of the motor for rotating the optical disk. Therefore, trying out the writing at the speed for the outer periphery is simply impractical by use of the PCA provided on the inner periphery of the disk. On the other hand, because the recording quality obtained at fast-speed recording is more degraded by the fluctuation of the recording power than at the low-speed recording, there is the problem that the experimental writing at fast speed is more necessary than at low speed.

As described in the related art, the compact disks or CD that have the experimental writing area provided on the outer periphery have so far been used, but they need a complicated procedure for the process to the outer-peripheral PCA and cannot provide satisfactory performance.

It is an object of the invention to provide a method of properly making fast experimental writing on inner-peripheral and outer-peripheral experimental writing areas of the disk, and an optical disk apparatus using this method, thereby solving the above problems.

According to this invention, there is provided an information recording method for recording information on a recording-type optical disk having an inner-peripheral experimental writing area, a data area and an outer-peripheral experimental writing area by irradiating a laser beam onto the disk, this method having the steps of writing the inner-peripheral experimental writing area, writing the outer-peripheral experimental writing area, and then recording information on the data area.

Moreover, there is provided an information recording method for recording information on a recording-type optical disk having an inner-peripheral experimental writing area, a data area and an outer-peripheral experimental writing area by irradiating a laser beam onto the disk, this method including the steps of writing the outer-peripheral experimental writing area, writing the inner-peripheral experimental writing area, and then recording information on the data area.

In addition, there is provided an optical disk apparatus for recording information on a recording-type optical disk having an inner-peripheral experimental writing area, a data area and an outer-peripheral experimental writing area by irradiating a laser beam onto the disk, this apparatus including a spindle for rotating the optical disk, a laser for irradiating a laser beam onto the optical disk, and an optical pickup including the laser, wherein this optical pickup writes data on the inner-peripheral experimental writing area, writes data on the outer-peripheral experimental writing area, and then records information on the data area.

Furthermore, there is provided an optical disk apparatus for recording information on a recording-type optical disk having an inner-peripheral experimental writing area, a data area and an outer-peripheral experimental writing area by irradiating a laser beam onto the disk, this apparatus including a spindle for rotating the optical disk, a laser for irradiating a laser beam onto the optical disk, and an optical pickup including the laser, wherein this optical pickup writes on the outer-peripheral experimental writing area, writes on the inner-peripheral experimental writing area, and then records information on the data area.

Other objects, features and advantages of the invention will become apparent from the following description of the embodiments of the invention taken in conjunction with the accompanying drawings.

DETAILED DESCRIPTION OF THE EMBODIMENTS

The first embodiment of the invention will be described first. In order to assure the satisfactory recording quality, this embodiment aims to write on the experimental writing area provided along the outer periphery of the optical disk, compare the recording characteristics of the inner and outer peripheries of the disk, and as a result, remove the inner and outer peripheral fluctuation factors that each optical disk has, in conjunction with the assurance of good recording performance at the fast recording on the outer periphery.

Figure 1:
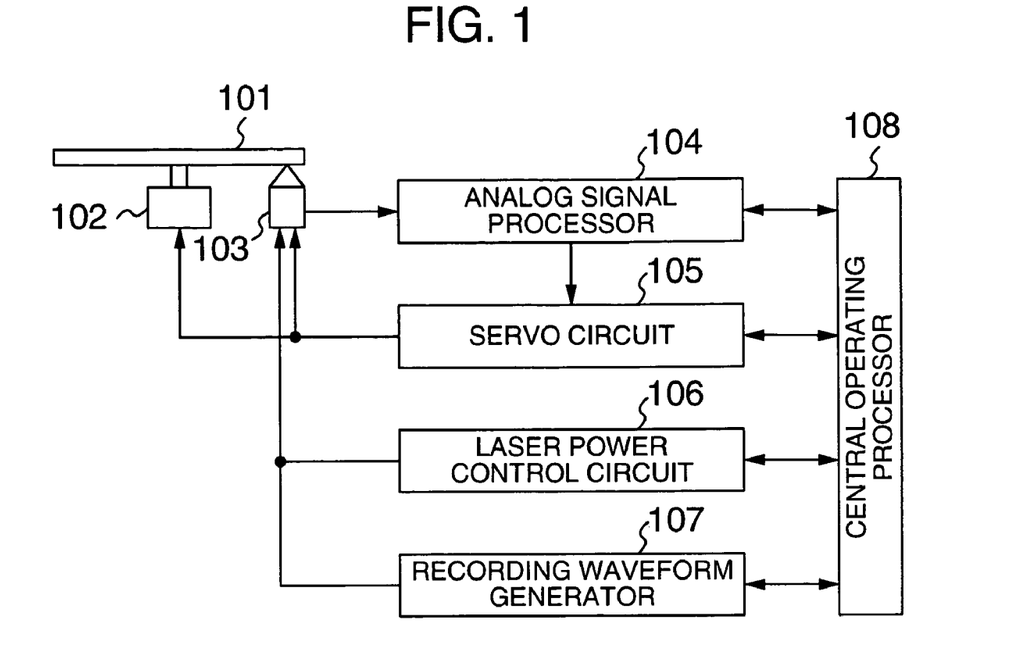
FIG. 1 is a block diagram of the construction of an optical disk apparatus according to the first embodiment of the invention.

FIG. 1 is a block diagram showing the construction of an optical disk apparatus according to the first embodiment of the invention. The drawing shows an optical disk 101 as an information recording medium, a spindle 102, an optical pickup 103, an analog signal processor 104, a servo circuit 105, a laser power control circuit 106, a recording waveform generator 107, and a central operating processor 108.

Figure 7:
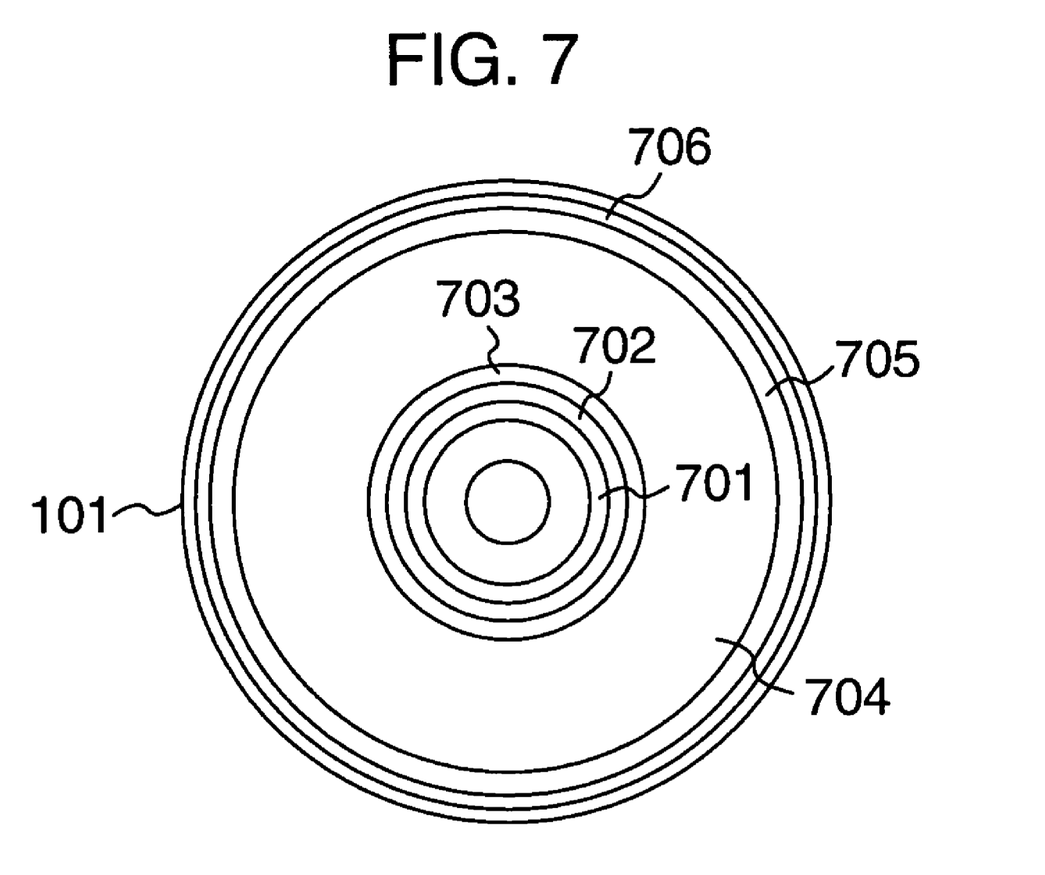
FIG. 7 is a diagram showing the optical disk.

FIG. 7 is a diagram showing the optical disk according to the first embodiment of the invention. The drawing shows an inner-peripheral PCA (Power Calibration Area) 701 located at the innermost periphery of the disk, an RMA (Recording Management Area) 702, a read-in area 703, a user data area 704, a read-out area 705, and an outer-peripheral PCA 706.

At the time of reproduction, the optical pickup 103 emits a laser beam to the optical disk 101 to read out a signal previously recorded thereon. This signal is supplied through the analog signal processor 104 to the central operating processor 108. The servo circuit or rotation control circuit 105 uses as a reference a wobble signal of a synchronizing signal previously embedded on the disk or a synchronizing signal previously recorded in order to control the spindle 102 to rotate at the optimum speed for the reading of data, and the optical pickup 103 to locate at a certain reading-out position above the disk.

At the time of recording, the central operating processor 108 produces recording information and supplies it to the laser power control circuit 106 and to the recording waveform generator 107. The laser power control circuit 106 controls the laser to produce the optimum laser power at the time of recording. The recording waveform generator 107 generates waveforms of recording emission corresponding to the data length of the recording information. The rotation control circuit 105 sends to the spindle 102 a control signal for the revolutionary speed corresponding to the recording speed, and to the optical pickup 103 a control signal for the recording position so that the optical pickup 103 can be located a predetermined position above the disk.

Figure 2:
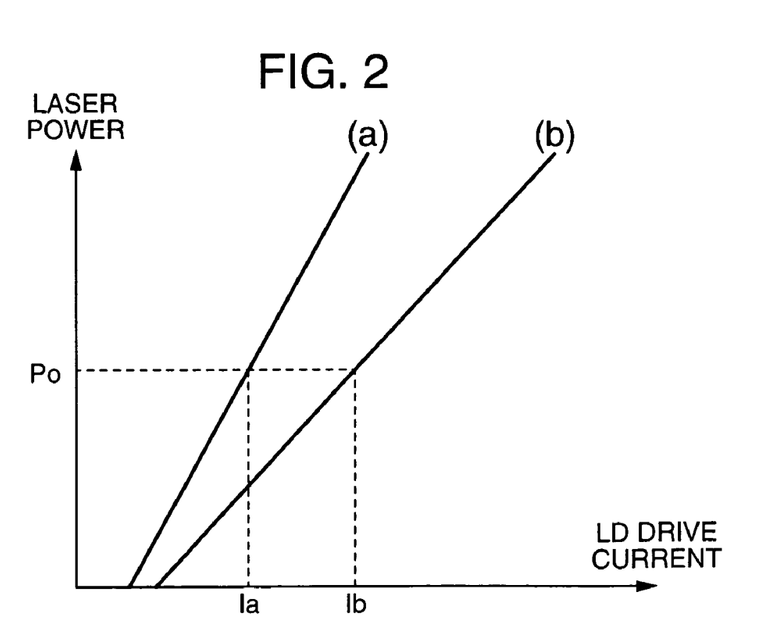
FIG. 2 is a graph showing the relation between the LD driving current and the generated recording power.

The amount of the laser power fluctuates depending on the ambient temperature. Therefore, the laser power control circuit 106 compensates the laser power for the output fluctuation. FIG. 2 is a graph showing the relation between the LD (Laser Diode) drive current and the output laser power. If, for example, the same laser power Po is desired to produce under the two different environmental conditions (a), (b), the drive currents of Ia, Ib must be given to the LD in accordance with the conditions, respectively. Thus, when the operating environment is changed from environmental condition (a) to (b), it is necessary that the laser control circuit corrects the drive current Ia to Ib so that the laser output power can be stabilized to be constant.

Figure 3:
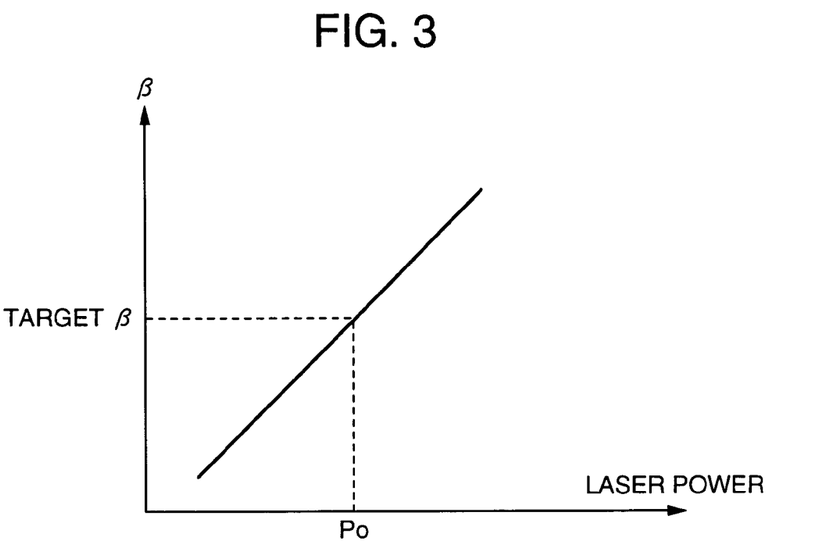
FIG. 3 is a graph showing the relation between the recording power and β.

FIG. 3 is a diagram showing the relation between the recording laser power and β (a parameter by which the vertical symmetry of the reproduced signal can be evaluated as by the asymmetry) produced at the time of reproduction. When the recording power Po is changed by a fixed write strategy, the relation between the recording power and β is given to be, as shown in FIG. 3, substantially proportional at around the optimum recording power. In addition, before the data area is recorded, the PCA is recorded with the recording power changed, and then it is reproduced at that position so that the optimum recording power Po can be derived from the detection of the target β. Here, the relation between the recording power and β is previously measured at the design stage and thus the target β at which the recording power Po is selected to give good recording characteristics can be indicated for the time of the experimental writing.

Figure 4:
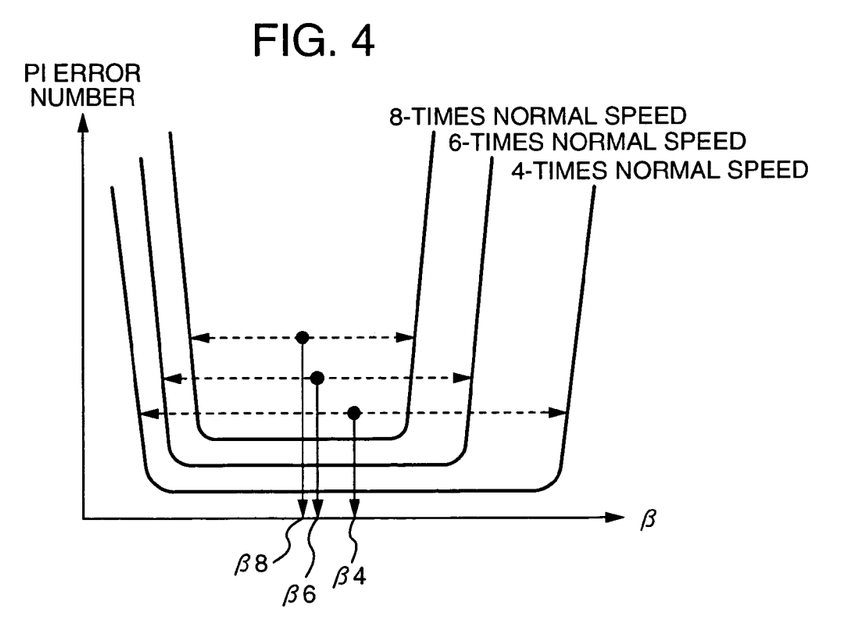
FIG. 4 is a graph showing the relation between β of each recording speed and the PI error number.

FIG. 4 is a diagram showing the relation of the same optical disk between the recording speed and the PI error that is detected at the time of reproduction. Since treating a plurality of recording media will complicate the explanation, a DVD-R will hereinafter be described. As an example, the results of the recording/reproduction of an optical disk are shown relative to the 8-times normal speed recording. If the recording power is set at around center of the characteristic curves of PI error, stable recording can be achieved against the various recording power fluctuation factors. β8, β6 and β4 indicate β values most appropriate for 8-times normal speed recording, 6-times normal speed recording and 4-times normal speed recording, respectively. From the graph, it will be understood that the optimum β value is changed with the change of recording speed. In addition, it will be seen that in order to assure the stabilized recording quality it is necessary to more precisely control the variation of β values under faster recording speeds.

Figure 5:
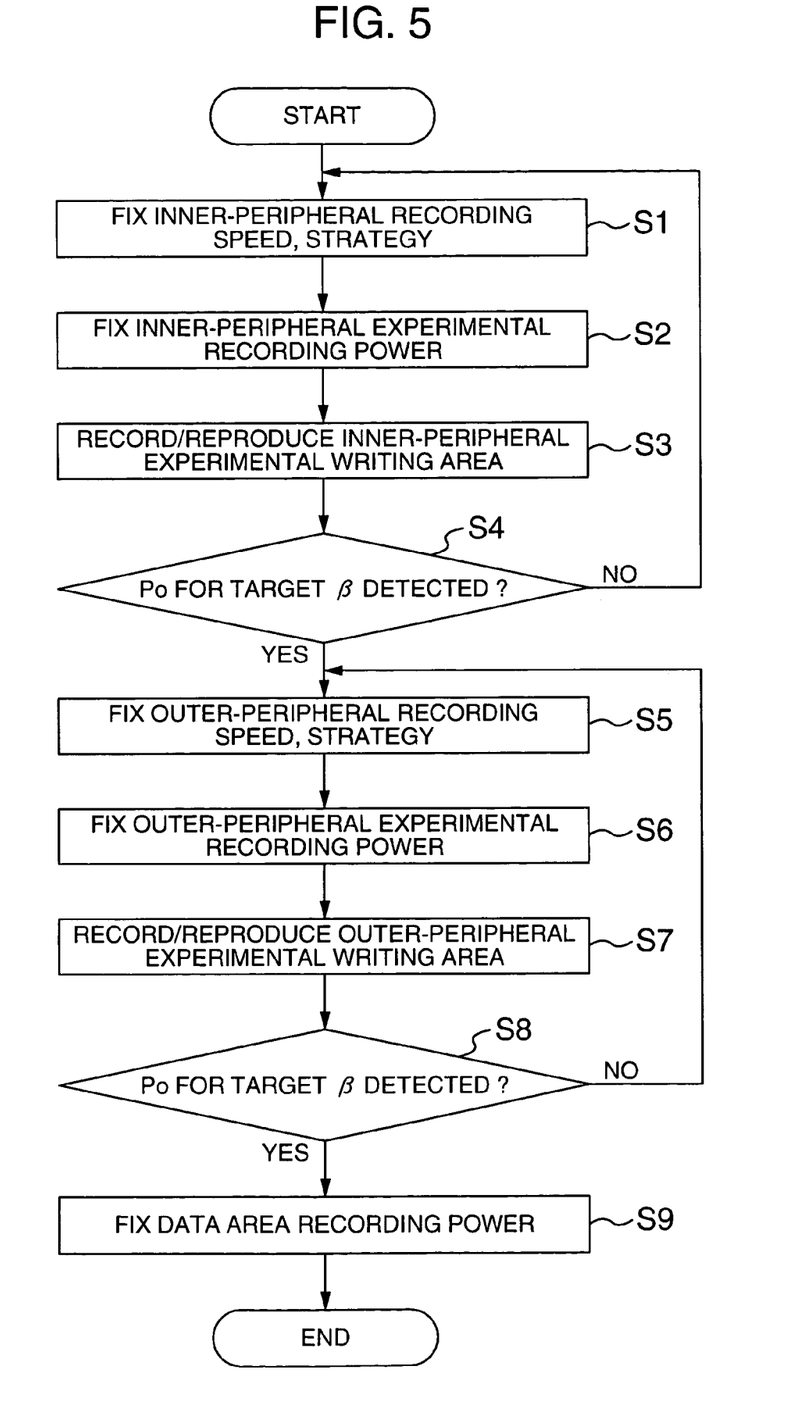
FIG. 5 is a flowchart for the recording power detection according to the first embodiment.

FIG. 5 is a flowchart according to the first embodiment of the invention. In the first step S1, we set up the inner-peripheral recording speed and strategy. The recording speed is selected as specified by the user or as determined by the optical disk apparatus, on the basis of the combination of the disk and the optical disk apparatus. In addition, the strategy to be used is previously verified at the design stage or previously embedded on the disk.

In the step S2, the recording power is selected to have some values around the value that is predicted to be the optimum for the combination of the disk and the optical disk apparatus so that the relation between the recording power and the subsequent reproduction results can be confirmed.

In the step S3, the disk is actually recorded with the previously selected values of recording power, and reproduced at the recorded area. At the time of reproduction, the reflectivity, modulation degree, β and PI error are measured, and the optimum recording power is detected. If the optimum recording power cannot be found due to improper ambient conditions, the ambient conditions are again selected, the control goes back to the step S1 for fresh start, and then the optimum recording power Po is detected in the step S4.

Figure 8:
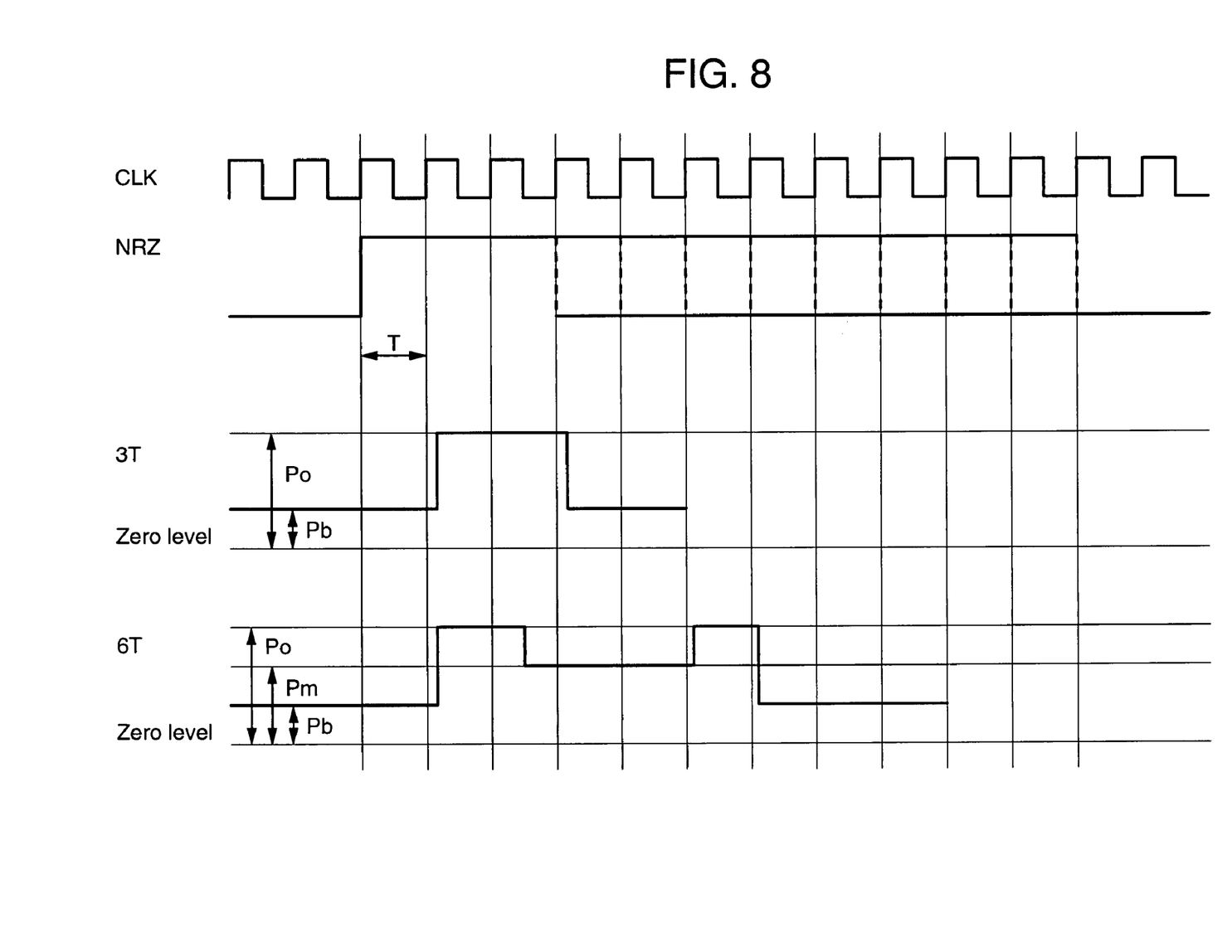
FIG. 8 is a timing chart showing the recording waveforms on DVD-R.

FIG. 8 shows the waveforms recorded on the DVD-R as an example of the recording waveforms used for experimental writing. As shown in FIG. 8, NRZ of 3T (T is the recording clock) and 4T is recorded by a one-pulse recording waveform, and NRZ of 5T or more is recorded by a strategy using two values of recording power Po and Pm. When NRZ of 5T or more is recorded, it is recommended to use a high recording power (Po) for the front and back periods and a low recording power (Pm) for the mid period that is lower than (or equivalent to) that for the front and back periods.

After the optimum recording power is found in the inner-peripheral OPC writing, the outer-peripheral OPC is started to write. In the step S5, the outer-peripheral recording speed and strategy are determined as in the step S1. The outer-peripheral recording speed can take the same value as the inner-peripheral recording speed. In the step S6, the recording power is selected to be probably optimum for the outer-peripheral recording speed unlike the setting of the inner-peripheral recording power.

This recording power can be estimated from the multiplication of a certain coefficient relative to the OPC writing result and the relation between the inner-and outer-peripheral recording speeds. The recording speed v and the recording power Po in the optical disk using thermal change have the relation given by $$Po = k \times \sqrt{v} \qquad (1)$$

(where k is a proportionality constant), that is, the recording power Po is proportional to the square root of the recording speed v. If the inner-peripheral and outer-peripheral speeds are 4 times normal and 8 times normal (outer-peripheral speed÷inner-peripheral speed=2), respectively, the optimum outer-peripheral recording power for the 8-times normal recording speed is 1.41 Po where Po is the optimum inner-peripheral recording power for the 4-times normal recording speed.

However, the optimum recording power sometimes changes in accordance with each write strategy. In addition, since the outer periphery of the disk has many fluctuation factors such as irregular coatings of the recording film, the optimum computed outer-peripheral recording speed should be decided to be appropriate or not after the experimental writing of at least ¼ circle or so. This is why most fluctuation factors can be removed by smoothing of ¼ circle.

In other words, when experimental writing is carried out along an interval of a constant length, a better result can be obtained by the experimental writing with a certain computed value of recording power and by deciding whether this recording power is optimum or not than by estimating the optimum outer-peripheral recording power after the experimental writing is repeated a plurality of times with the recording power changed.

In the step S7, the recording/reproducing is performed with the recording power set in the step S6, and the reflectivity, modulation degree, β and PI error are measured. Then, the result of the experimental writing on the outer periphery is decided on the basis of the result previously verified at the design stage of the optical disk apparatus, and the optimum recording power is determined from the relation between the recording power and β.

In the step S7, if the result of recording is different from the optimum recording power, the computed result is used. In the step S8 for deciding the optimum outer-peripheral recording power, if the recording power for the experimental writing is greatly different from the optimum value, for example, 10% or more separated from the optimum recording power after computation, the program goes back to the step S5 or S6 from which the same processes as mentioned above are repeated to again change the settings such as to reduce the recording speed, alter the strategy and change the recording power, and the recording/reproduction for the experimental writing is again performed to find the optimum recording power.

In the step S9, the difference between the recording sensitivities on the inner periphery and outer periphery of the disk can be roughly estimated from the relation among the optimum inner-peripheral and outer-peripheral recording power values, modulation degree and β, and the recording power for recording from the inner periphery to the outer periphery can be determined on the basis of this result.

If 4-times normal recording is made over the entire optical disk surface, the sensitivity correction is performed on the basis of the result previously obtained at the design stage because the result is affected only by the difference between the sensitivities on the inner and outer peripheries of the disk.

For example, the recording power can be set by the following equation for the linear complement of sensitivity difference.

$$Po = Poi \times (1 + R \times Poo/Poi) \qquad (2)$$

(where Poo is the optimum outer-peripheral recording power, Poi is the optimum inner-peripheral recording power, and R is a coefficient based on the radial position).

In order for Po and Pm to keep at a predetermined ratio, Pm is determined from the following equation.

$$Pm = Po/A \qquad (3)$$

(where A is a predetermined value or a value based on the experimental writing).

Then, for the case of 4-times normal speed recording on the inner periphery and 8-times normal speed recording on the outer periphery, changes according to the recording speeds must be included in the above equation. As an example of the relationship for deriving the recording power, the following equations can be given:

$$Po4 = Poi \times (1 + R \times (Poo/\text{ratio})/Poi) \qquad (4)$$

$$Po8 = (Poi \times \text{ratio}) \times (1 + R \times (Poo/\text{ratio})/Poi) \qquad (5)$$

(where Po4 is the 4-times normal speed recording power, Po8 is the 8-times normal speed recording power, and ratio is proportionality constant between Po4 and Po8).

The following equation generally holds for the 8-times normal speed recording power though it was previously given.

$$Po8 = 1.41 Po4 \qquad (6)$$

In this case, the coefficient can be changed depending on the relation with the strategy for 4-times normal speed and 8-times normal speed.

The optimum recording power is selected only for the outer-peripheral recording power by considering the following factors.

A satisfactory recording performance cannot be fully obtained on the outer periphery of the disk.

The sensitivity of the outer periphery of the disk to the laser power sometimes becomes larger than that of the inner periphery.

The local recording on the outer periphery of the disk is easy to be affected by the variations in the circumferential direction.

Moreover, while in the above embodiment the outer-peripheral experimental recording power is fixed only to the optimum recording power derived from the inner-peripheral experimental writing, the recording power for the recording/reproduction may be changed variously around the optimum recording power for the sake of making the optimum recording power derivation more efficient.

Figure 6:
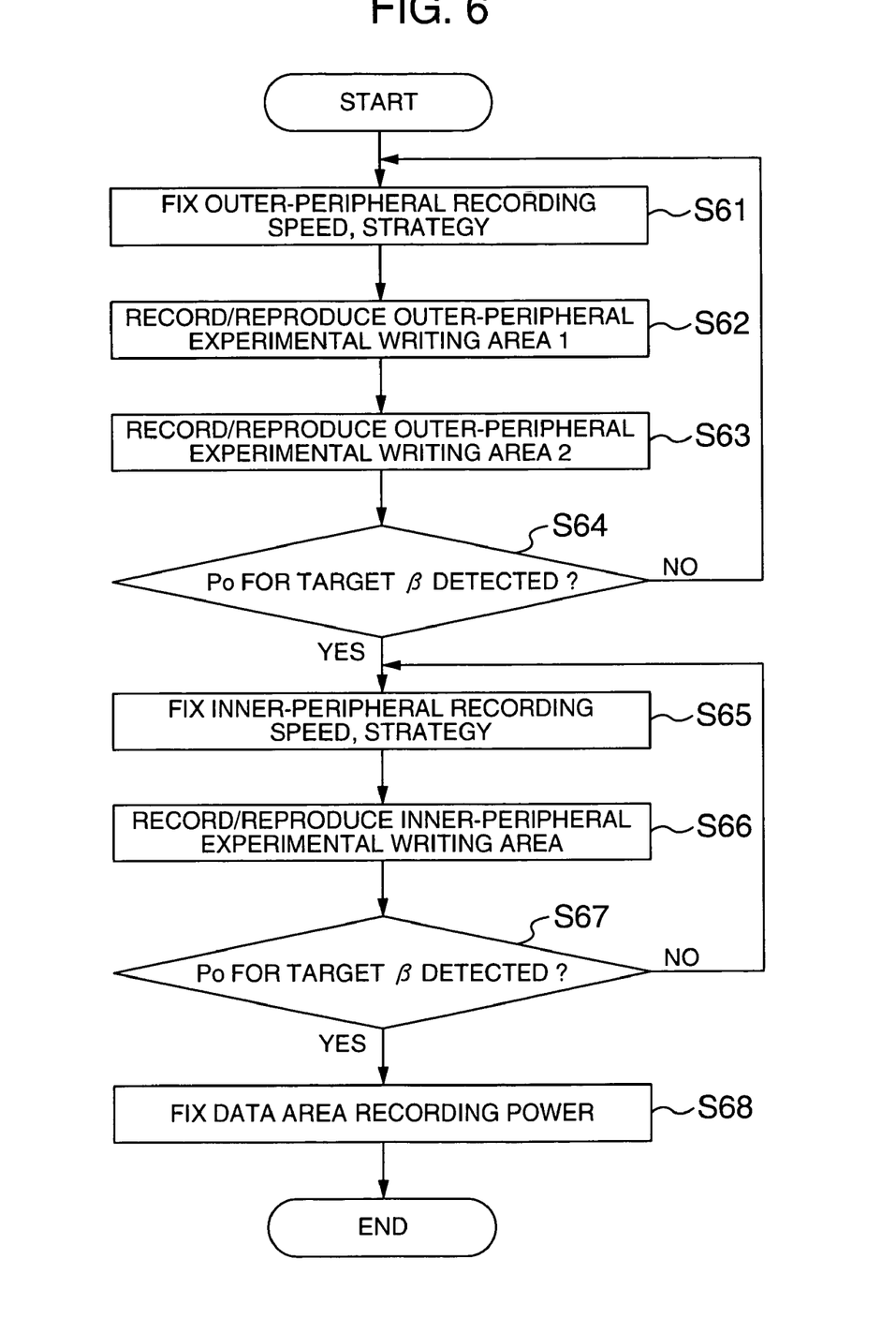
FIG. 6 is a flowchart for the recording power detection according to the second embodiment.

The second embodiment of the invention will be described below. The construction of the optical disk apparatus of this embodiment is equivalent to that shown in FIG. 1, and thus it will not be described. FIG. 6 is a flowchart according to the second embodiment of the invention. The fundamental operations are the same as in the first embodiment. However, the experimental writing of the outer-peripheral PCA and then the experimental writing of the inner-peripheral PCA are performed so as to determine the inner-peripheral optimum recording power and outer-peripheral optimum recording power.

In the step S61, the outer-peripheral recording speed and its strategy are fixed for the outer-peripheral PCA. In the step S62, the normal experimental writing is performed on the outer periphery. Here, the common experimental writing is the same as that in the conventional method for the inner-peripheral experimental writing. The recording is made with the recording power changed for each sector unit or frame unit (the sector and frame are each the unit of recording length), and the optimum value of recording power is determined from the measurements of the resulting reflectivity, modulation degree, β and PI error.

In the step S63, recording/reproduction for experimental writing of about ¼ circle is carried out after the setting to the optimum recording power derived in the step S62. The recording power is verified on the basis of the measurements of the resulting reflectivity, modulation degree, β and PI error. In this case, since the experimental writing is first made on the outer periphery of the disk, the common experimental writing will be affected by the variables that depend on the circumferential position of the laser beam on the disk. Therefore, as in the step S63, it is necessary to make writing of about ¼ circle with the optimum recording power and check the recording quality.

In the step S64, if the desired results of measurement can be obtained with the optimum recording power, the program goes to the next step S65 for the inner-peripheral experimental writing. In this step, the inner-peripheral recording speed and its strategy are fixed. In the step S66, the inner-peripheral experimental writing is performed to determine the inner-peripheral optimum recording power. If the optimum recording power cannot be correctly detected in the step S67, the steps S65 and S66 are repeated.

In the step S68, when the 4-times normal speed recording is made on the entire surface, the optimum recording power for each radial position is derived from the equations (2) and (3) on the basis of the above results. In the case of inner-peripheral 4-times normal speed and outer-peripheral 8-times normal speed recording, similarly the recording power can be derived from the equations (4), (5) and (6) and used for the optimum recording on each disk.

While in the above embodiments the inner-peripheral and outer-peripheral recording speeds are selected to be 4-times normal and 8-times normal, respectively, the present invention of this application is of course not limited to these recording speeds. In addition, the recording control method may be CLV (Constant Linear Velocity) control or ZCLV (Zone CLV) control system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information recording method for recording information on a recording-type optical disk having an inner-peripheral experimental writing area, a data area and an outer-peripheral experimental writing area by irradiating a laser beam thereon, said method comprising the steps of:

writing on said inner-peripheral experimental writing area;

writing on said outer-peripheral experimental writing area, said outer-peripheral experimental writing area including a plurality of frames; and then recording information on said data area, wherein said writing on said outer-peripheral experimental writing area is performed with a single value of recording power over the plurality of frames in order to determine a writing power, and wherein said single value of recording power for said writing on said outer-peripheral experimental writing area is a recording power calculated from the recording power determined by said writing on said inner-peripheral experimental writing area.

2. The method according to claim 1, wherein the speed in said writing on said inner-peripheral experimental writing area is the same as that in said writing on said outer-peripheral experimental writing area.

3. The method according to claim 1, wherein the speed in said writing on said inner-peripheral experimental writing area is different from that in said writing on said outer-peripheral experimental writing area.

4. The method according to claim 1, wherein the plurality of frames of said outer-peripheral writing area are consecutive recording frames of substantially a ¼ circle in a circumferential direction of said recording-type optical disk.

5. An information recording method for recording information on a recording-type optical disk having an inner-peripheral experimental writing area, a data area and an outer-peripheral experimental writing area by irradiating a laser beam thereon, said method comprising the steps of:

writing on said outer-peripheral experimental writing area;

writing on said inner-peripheral experimental writing area, said inner-peripheral writing area including a plurality of frames; and then recording information on said data area, wherein said writing on said inner-peripheral experimental writing area is performed with a single value of recording power over the plurality of frames in order to determine a writing power, and wherein said single value of recording power for said writing on said inner-peripheral area is a recording power calculated from the recording power determined by said writing on said outer-peripheral experimental area.

6. The method according to claim 5, wherein the speed in said writing on said inner-peripheral experimental writing area is the same as that in said writing on said outer-peripheral experimental writing area.

7. The method according to claim 5, wherein the speed in said writing on said inner-peripheral experimental writing area is different from that in said writing on said outer-peripheral experimental writing area.

8. The method according to claim 5, wherein the plurality of frames of said inner-peripheral writing area are consecutive recording frames of substantially a ¼ circle in a circumferential direction of said recording-type optical disk.

9. An optical disk apparatus for recording information on a recording-type optical disk having an inner-peripheral experimental writing area, a data area and an outer-peripheral experimental writing area by irradiating a laser beam thereon, said apparatus comprising:

a spindle for rotating said optical disk;

a laser for irradiating a laser beam onto said optical disk; and an optical pickup having said laser provided thereon, said optical pickup writing on said inner-peripheral experimental writing area and writing on said outer-peripheral experimental writing area, and then recording information on said data area, wherein said outer-experimental writing area includes a plurality of frames, the writing on said outer-peripheral experimental writing area being performed with a single value of recording power over the plurality of frames in order to determine a writing power, and wherein said single value of writing power of said optical pickup is a recording power calculated from the recording power estimated from said writing on said outer-peripheral experimental writing area and said writing on said inner-peripheral experimental writing area.

10. The apparatus according to claim 9, wherein the speed in said writing on said inner-peripheral experimental writing area is the same as that in said writing on said outer-peripheral experimental writing area.

11. The apparatus according to claim 9, wherein a recording speed of the writing on said inner-peripheral writing area is different from that of the writing on said outer-peripheral writing area.

12. The apparatus according to claim 9, wherein the plurality of frames of said outer-peripheral writing area are consecutive recording frames of substantially a ¼ circle in a circumferential direction of said recording-type optical disk.

13. An optical disk apparatus for recording information on a recording-type optical disk having an inner-peripheral experimental writing area, a data area and an outer-peripheral experimental writing area by irradiating a laser beam thereon, said apparatus comprising:

a spindle for rotating said optical disk;

a laser for irradiating a laser beam onto said optical disk; and an optical pickup having said laser provided thereon, said optical pickup writing said outer-peripheral experimental writing area including a plurality of frames, writing on said inner-peripheral experimental writing area, and then recording information on said data area, wherein said writing on said inner-peripheral experimental writing area is performed with a single value of recording power over the plurality of frames in order to determine a writing power, and wherein said single value of writing power of said optical pickup is a recording power calculated from the recording power estimated from said writing on said outer-peripheral experimental writing area.

14. The apparatus according to claim 13, wherein the speed in said writing on said inner-peripheral experimental writing area is different from that in said writing on said outer-peripheral experimental writing area.

15. The apparatus according to claim 13, wherein a recording speed of the writing on said inner-peripheral writing area is the same recording speed as the writing on said outer-peripheral writing area.

16. The apparatus according to claim 13, wherein the plurality of frames of said inner-peripheral writing area are consecutive recording frames of substantially a ¼ circle in a circumferential direction of said recording-type optical disk.

* * * * *